US012157327B2

United States Patent
Murakami et al.

(10) Patent No.: US 12,157,327 B2
(45) Date of Patent: Dec. 3, 2024

(54) MEDIUM INCLUDING HEAT-SENSITIVE MEDIUM AND ADHESIVE MEDIUM WHOSE BASE MATERIAL HAS IMAGE PRE-PRINTED THEREON

(71) Applicant: BROTHER KOGYO KABUSHIKI KAISHA, Nagoya (JP)

(72) Inventors: Sachiko Murakami, Okazaki (JP); Kohei Terada, Kiyosu (JP); Keisuke Nishihara, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/561,498

(22) Filed: Dec. 23, 2021

(65) Prior Publication Data

US 2022/0203746 A1    Jun. 30, 2022

(30) Foreign Application Priority Data

Dec. 28, 2020    (JP) .................................. 2020-219199

(51) Int. Cl.
*B41M 5/40*       (2006.01)
*B32B 7/12*       (2006.01)
(Continued)

(52) U.S. Cl.
CPC ............... *B41M 5/40* (2013.01); *B32B 37/12* (2013.01); *B32B 38/145* (2013.01); *B41J 15/044* (2013.01); *B32B 7/12* (2013.01)

(58) Field of Classification Search
None
See application file for complete search history.

(56) References Cited

U.S. PATENT DOCUMENTS 7,319,472 B2 *   1/2008  Inoue ....................... B41J 2/525
                                                              347/175
2002/0154933 A1   10/2002 Kalette
(Continued)

FOREIGN PATENT DOCUMENTS

JP         H07323662 A    * 12/1995
JP         2006-289954 A    10/2006
(Continued)

OTHER PUBLICATIONS

Japanese Office Action for the related Japanese Patent Application No. 2020-219199 dated Apr. 23, 2024.

*Primary Examiner* — Michael N Orlando
*Assistant Examiner* — Abhishek A Patwardhan
(74) *Attorney, Agent, or Firm* — KENEALY VAIDYA LLP

(57) ABSTRACT

A medium includes a heat-sensitive medium and an adhesive medium. The heat-sensitive medium includes a first base material and a first color-developing layer. The first base material has a transparency. The first color-developing layer has a transparency. The first color-developing layer is provided on a first surface of the first base material. The first color-developing layer is configured to become less transparent to develop a first color when heated to a first temperature or higher. The adhesive medium is to be superimposed on and bonded to the heat-sensitive medium in their thickness direction. The adhesive medium includes a second base material and an adhesive layer provided on the second base material. The adhesive medium is to be bonded to the heat-sensitive medium on an opposite side of the first color-developing layer from the first base material. The first base material has one or more images pre-printed thereon.

12 Claims, 8 Drawing Sheets

(51) Int. Cl.
  *B32B 37/12* (2006.01)
  *B32B 38/00* (2006.01)
  *B41J 15/04* (2006.01)

(56) References Cited

U.S. PATENT DOCUMENTS

| | | |
|---|---|---|
| 2008/0279605 A1 | 11/2008 | Yamaguchi et al. |
| 2012/0039651 A1* | 2/2012 | Yamaguchi ............... B41J 3/50 |
| | | 400/613 |
| 2013/0021421 A1 | 1/2013 | Ishikawa et al. |
| 2019/0023026 A1* | 1/2019 | Numao .................... B32B 3/30 |
| 2019/0061375 A1 | 2/2019 | Matsumoto |
| 2020/0384789 A1 | 12/2020 | Kohara et al. |

FOREIGN PATENT DOCUMENTS

| | | |
|---|---|---|
| JP | 2008-006830 A | 1/2008 |
| JP | 2008-538332 A | 10/2008 |
| JP | 2012-076312 A | 4/2012 |
| JP | 2012-245769 A | 12/2012 |
| JP | 2017-177438 A | 10/2017 |
| JP | 2017-187592 A | 10/2017 |
| JP | 2018-154099 A | 10/2018 |
| WO | 02/096665 A1 | 12/2002 |
| WO | 2006108171 A3 | 4/2009 |
| WO | 2017170130 A1 | 10/2017 |

\* cited by examiner

FIG. 1
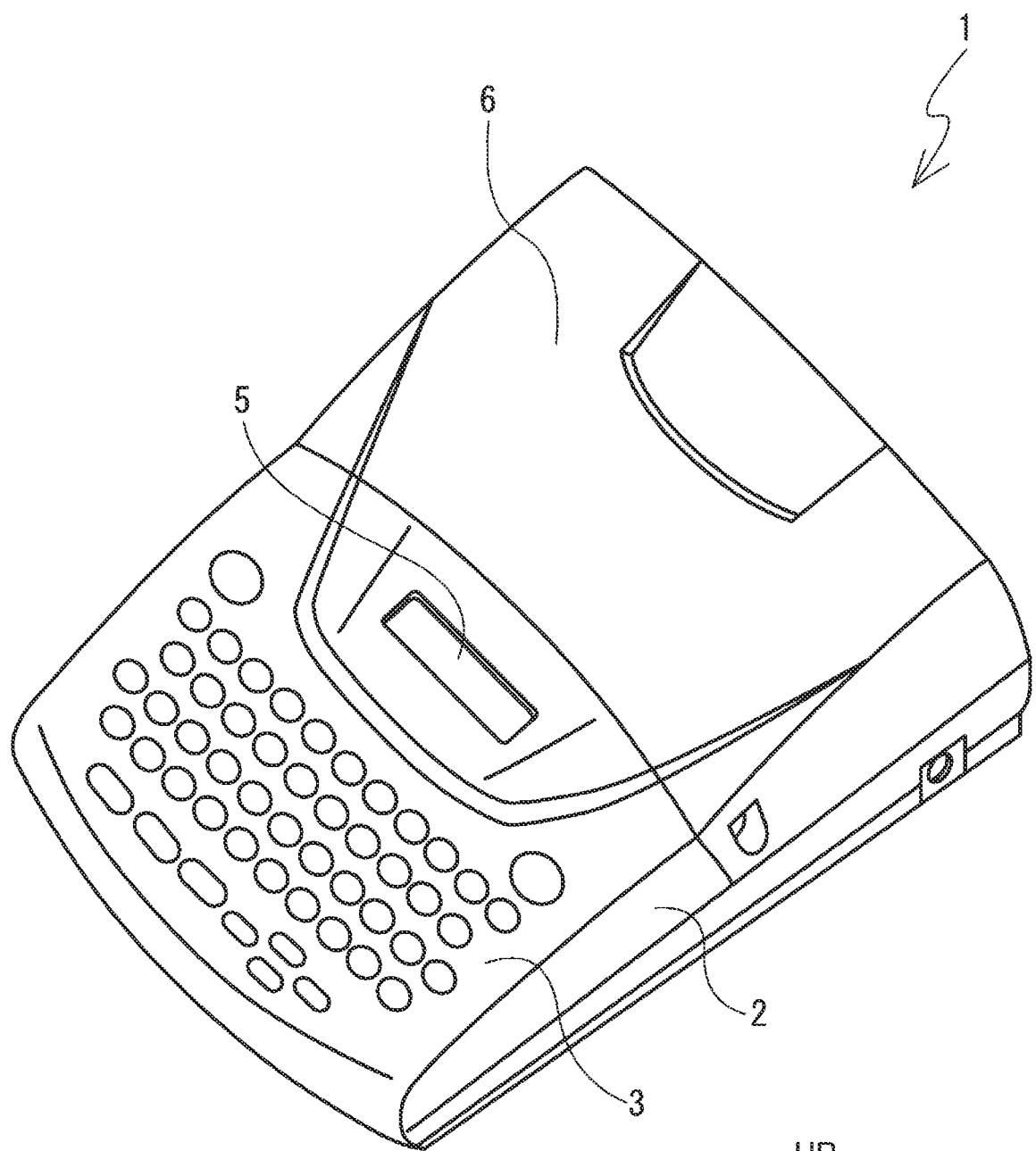
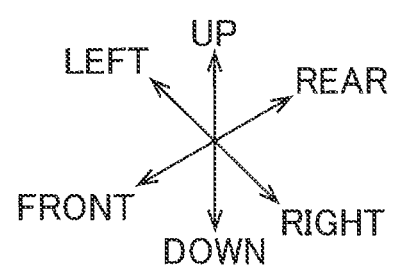

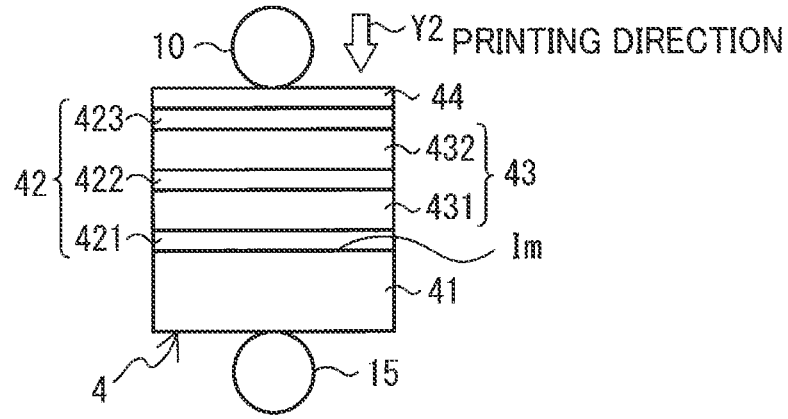
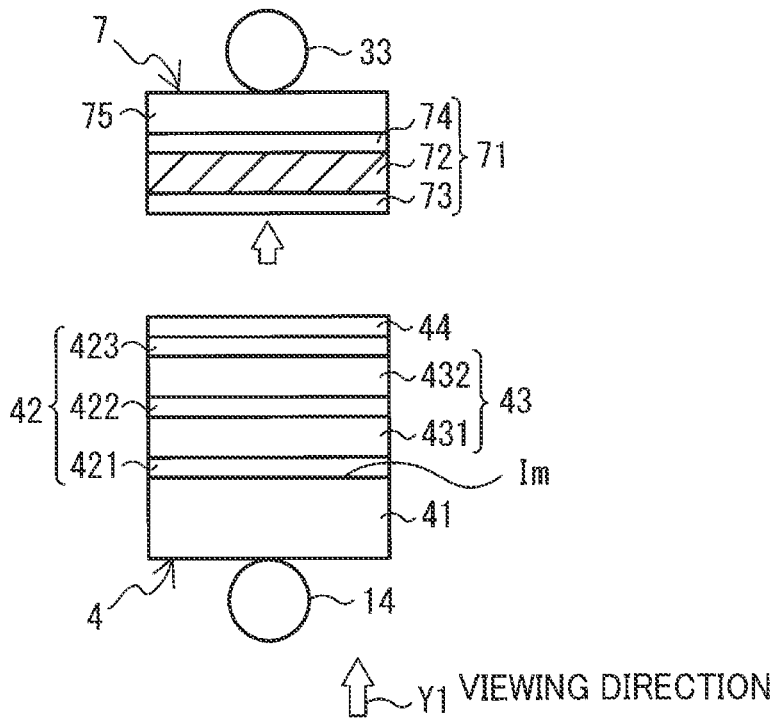
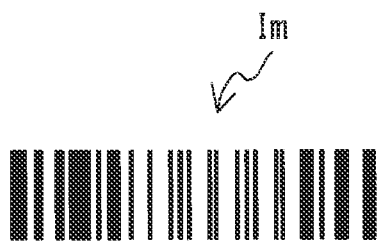

MEDIUM INCLUDING HEAT-SENSITIVE MEDIUM AND ADHESIVE MEDIUM WHOSE BASE MATERIAL HAS IMAGE PRE-PRINTED THEREON

CROSS REFERENCE TO RELATED APPLICATIONS

This application claims priority from Japanese Patent Application No. 2020-219199 filed Dec. 28, 2020. The entire content of the priority application is incorporated herein by reference.

BACKGROUND

There have been conventionally known a cartridge, a thermal printer, a heat-sensitive medium, and an adhesive medium. The heat-sensitive medium and adhesive medium are accommodated in the cartridge. The heat-sensitive medium has a heat-sensitive layer, a first protective layer, and a second protective layer. The heat-sensitive layer produces a single color when heated. The first protective layer and second protective layer are respectively provided on opposite sides of the heat-sensitive layer with respect to the thickness direction of the medium in order to protect the heat-sensitive layer. The cartridge is detachably mounted in the thermal printer. The thermal printer performs printing while the cartridge is mounted therein by heating the heat-sensitive medium from the side of the second protective layer to develop color in the heat-sensitive medium. Subsequently, the printer creates a laminated medium printed with a single color by bonding the adhesive medium to the printed heat-sensitive medium.

SUMMARY

A configuration is conceivable in which the medium described above is pre-printed with a fixed format. However, the visibility of this fixed format might worsen as the heat-sensitive medium degrades over time, for example.

In view of the foregoing, it is an object of the present disclosure to provide a medium that can improve the visibility of a pre-printed image, a cartridge for accommodating therein the medium, and a method of creating the medium.

In order to attain the above and other object, according to a first aspect, the present disclosure provides a medium including a heat-sensitive medium and an adhesive medium. The heat-sensitive medium is to be subjected to printing in a thermal printer. The heat-sensitive medium includes a first base material and a first color-developing layer. The first base material has a transparency. The first base material has a first surface. The first color-developing layer has a transparency. The first color-developing layer is provided on the first surface of the first base material. The first-color developing layer is configured to become less transparent to develop a first color when heated to a first temperature or higher. The adhesive medium is to be superimposed on and bonded to the heat-sensitive medium in a thickness direction of the adhesive medium and the heat-sensitive medium. The adhesive medium includes a second base material and an adhesive layer. The adhesive layer is provided on the second base material. The adhesive medium is to be bonded to the heat-sensitive medium on an opposite side of the first color-developing layer from the first base material. The first base material has one or more images pre-printed on the first base material.

In the medium according to the first aspect, one or more images are pre-printed on the first base material. Hence, the one or more pre-printed images are highly visible to the user, thereby enhancing visibility of the one or more pre-printed images.

According to a second aspect, the present disclosure provides a cartridge for accommodating therein the medium according to the first aspect. The cartridge includes a case, a first holder, and a second holder. The first holder is provided inside the case. The first holder holds the heat-sensitive medium. The second holder is provided inside the case. The second holder holds the adhesive medium.

The cartridge according to the second aspect accommodates therein the medium according to the first aspect. Hence, the one or more pre-printed images are highly visible to the user, thereby enhancing visibility of the one or more pre-printed images.

According to a third aspect, the present disclosure provides a method of creating a laminated medium using the medium according to the first aspect. The method includes: (a) printing by heating the first color-developing layer. The method further includes: (b) after performing the printing in (a), creating a laminated medium by bonding the adhesive medium to the heat-sensitive medium on an opposite side of the first heat-sensitive layer from the first base material.

The method according to the third aspect uses the medium according to the first aspect to create a laminated medium. Hence, the one or more pre-printed images are highly visible to the user, thereby enhancing visibility of the one or inure pre-printed images.

BRIEF DESCRIPTION OF THE DRAWINGS

The particular features and advantages of the embodiment (s) as well as other objects will become apparent from the following description taken in connection with the accompanying drawings, in which:

FIG. 1 is a perspective view of a thermal printer 1;

FIG. 5A is a plan view for describing how a printing operation is performed on the heat-sensitive tape 4 in the thermal printer 1;

FIG. 5B is a plan view for describing how the printed heat-sensitive tape 4 and the adhesive tape 7 are bonded to each other in the thermal printer 1;

FIG. 5C is a plan view of a base material 41 having an image of a barcode Im pre-printed thereon;

DETAILED DESCRIPTION

Printing System According to an Embodiment

Hereinafter, an embodiment of the present disclosure will be described while referring to the accompanying drawings.

The referenced drawings are used to describe the technical features made possible with the present disclosure. The configurations, control, and the like of the apparatuses described below are merely examples, and the present disclosure is not intended to be limited to these configurations, control, and the like.

A printing system according to the present embodiment will be described. The printing system of the present embodiment includes a thermal printer 1 (see FIG. 1), and a tape cassette 30 (see FIG. 2).

Figure 2:
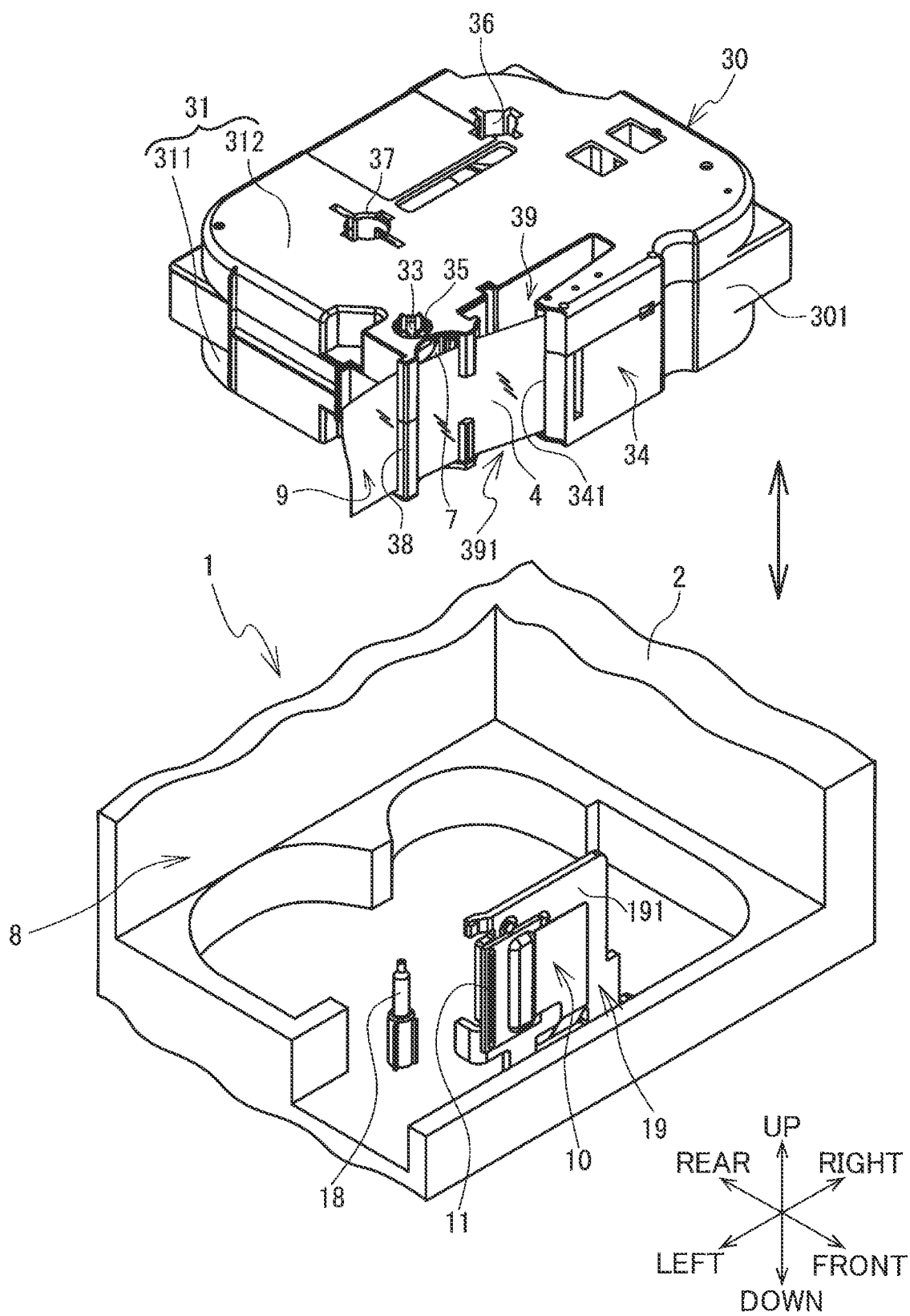
FIG. 2 is a perspective view of a tape cassette 30 and an attachment portion 8.
Figure 3:
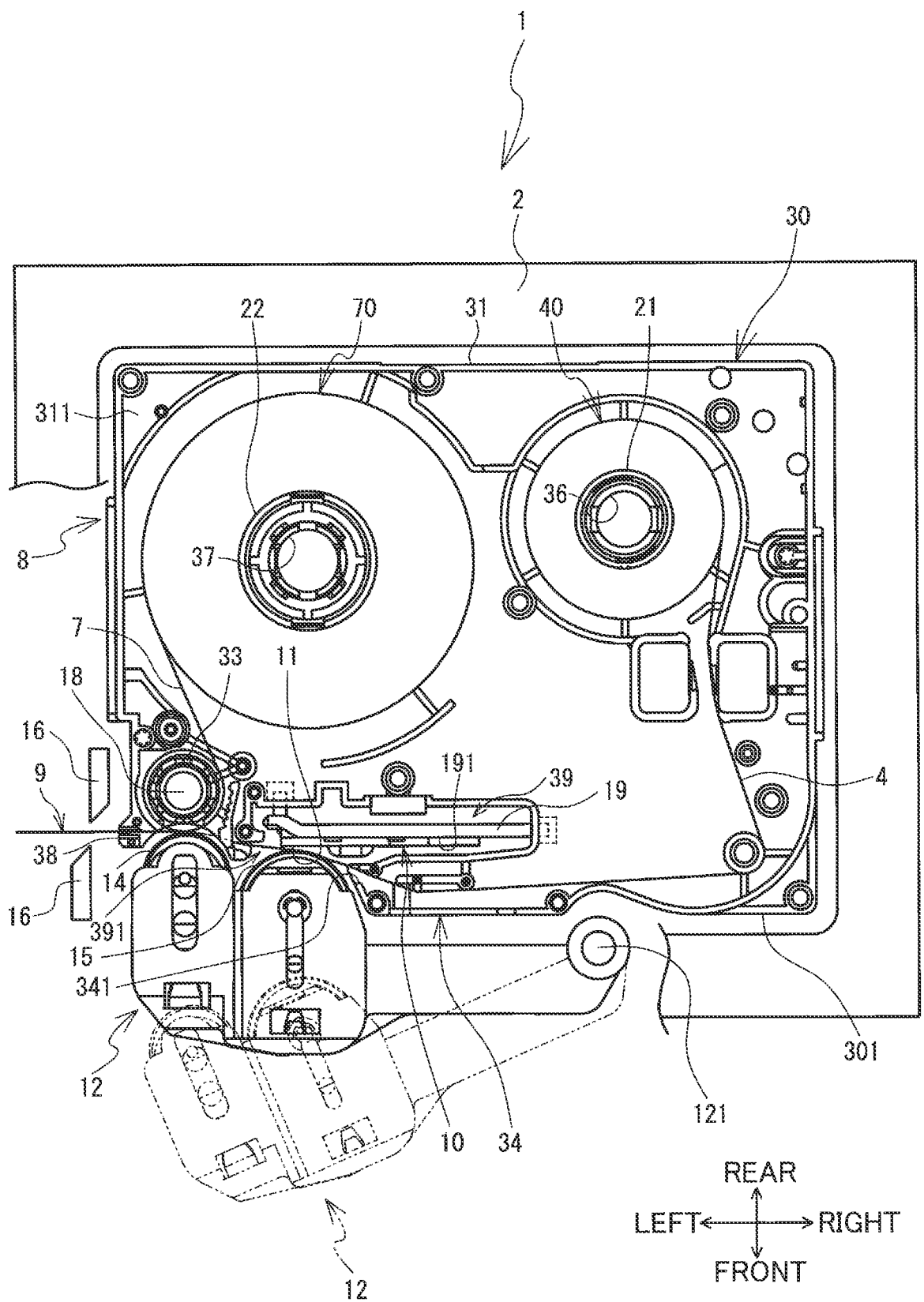
FIG. 3 is a plan view of the attachment portion 8 having the tape cassette 30 mounted therein.

In the following description, the lower-left side, upper-right side, lower-right side, upper-left side, top side, and bottom side of the thermal printer 1 in FIG. 1 are respectively defined as the front side, rear side, right side, left side, top side, and bottom side of the thermal printer 1. The lower-right side, upper-left side, upper-right side, lower-left side, top side, and bottom side of the tape cassette 30 in FIG. 2 are respectively defined as the front side, rear side, right side, left side, top side, and bottom side of the tape cassette 30. Further, FIG. 3 illustrates a state where the tape cassette 30 is mounted in an attachment portion 8 of the thermal printer 1 while omitting illustration of an upper case 312 of the tape cassette 30 to facilitate understanding.

The thermal printer 1 is configured to print alphanumeric characters, symbols, graphics, and the like on a heat-sensitive tape 4 using the tape cassette 30. Subsequently, the thermal printer 1 bonds an adhesive tape 7 to the heat-sensitive tape 4 to create a laminated tape 9.

External Structure of the Thermal Printer 1

As shown in FIG. 1, the thermal printer 1 includes a device body 2. The device body 2 has a box shape. A keyboard 3 is provided on a front portion of the top surface of the device body. A user can input various types of information into the thermal printer 1 by operating the keyboard 3. A display 5 is provided to the rear of the keyboard 3. The display 5 is configured to display inputted information.

A cassette cover 6 is provided to the rear of the display 5. The cassette cover 6 is openable and closable for exposing and covering the attachment portion 8 (see FIG. 2) from the above. The user opens and closes the cassette cover 6 when replacing the tape cassette 30 (see FIG. 2). A discharge slit (not shown) is formed in a rear portion of the left side surface of the device body 2. The discharge slit allows the laminated tape 9 to be discharged therethrough from the thermal printer 1.

Internal Structure of the Thermal Printer 1

As shown in FIG. 2, the attachment portion 8 is provided inside the device body 2 below the cassette cover 6 (see FIG. 1). The attachment portion 8 is a recessed part that is recessed downward from the top surface of the device body 2 and has a shape in conformance with the shape of the tape cassette 30. Thus, when the cassette cover 6 is open, the tape cassette 30 can be mounted in and removed from the attachment portion 8. A head holder 19 is disposed in a front portion of the attachment portion 8. The head holder 19 has a plate-like shape and extends in the vertical direction and in the left-right direction. The head holder 19 has a front surface 191. A thermal head 10 is provided on the front surface 191 of the head holder 19. The thermal head 10 includes a plurality of heating elements 11. The heating elements 11 are arranged in line with respect to the vertical direction. In a printing process described later, the thermal head 10 applies heat with the heating elements 11 to the heat-sensitive tape 4 exposed through an opening 341 (described later) while the tape cassette 30 is mounted in the attachment portion 8.

A drive shaft 18 for conveying the heat-sensitive tape 4 and the adhesive tape 7 is disposed leftward and rearward of the head holder 19. The drive shaft 18 extends upward from the bottom surface of the attachment portion 8. The drive shaft 18A is driven by a conveying motor 95 (see FIG. 6) to rotate.

As shown in FIG. 3, a cutting mechanism 16 is provided in the device body 2 on the left side of the drive shaft 18. When driven by a cutting motor 96 (see FIG. 6) provided in the thermal printer 1, the cutting mechanism 16 cuts the laminated tape 9. A platen holder 12 is provided in the device body 2 on the left side of the head holder 19. The platen holder 12 is an arm-like member and is supported by a support shaft 121 extending in the vertical direction. Specifically, the platen holder 12 is supported by the support shaft 121 so as to pivotally move about the axis of the support shaft 121. The support shaft 121 is provided in the right end of the platen holder 12.

A platen roller 15 and a movable roller 14 are rotatably supported on the free end portion of the platen holder 12. The platen roller 15 is configured to contact and separate from the thermal head 10 in accordance with pivotal movement of the platen holder 12. The movable roller 14 is disposed on the left side of the platen roller 15. The movable roller 14 is configured to contact and separate from a conveying roller 33 (described later) in accordance with pivotal movement of the platen holder 12.

In the present embodiment, the platen holder 12 is configured to move toward a standby position (the position depicted by dashed lines in FIG. 3) when the cassette cover 6 is opened, and to move toward a printing position (the position depicted by solid lines in FIG. 3) when the cassette cover 6 is closed. In the standby position, the platen holder 12 is separated from the attachment portion 8. Accordingly, the user can mount and remove the tape cassette 30 in and from the attachment portion 8.

In the printing position, the platen holder 12 is positioned adjacent to the attachment portion 8. Accordingly, when the tape cassette 30 is mounted in the attachment portion 8 and the cassette cover 6 is closed, the platen roller 15 presses the heat-sensitive tape 4 against the thermal head 10, and the movable roller 14 presses the heat-sensitive tape 4 and adhesive tape 7 against the conveying roller 33 such that the heat-sensitive tape 4 and adhesive tape 7 are superimposed with each other.

The conveying motor 95 (see FIG. 6) is configured to drive the platen roller 15 to rotate together with the drive shaft 18. In order to suppress slack in the heat-sensitive tape 4 due to conveyance, the platen roller 15 and drive shaft 18 are coupled to the conveying motor 95 through a plurality of gears (not shown) such that the rotational speed of the platen roller 15 is slower than the rotational speed of the drive shaft 18 (the conveying roller 33).

Structure of the Tape Cassette 30

As shown in FIG. 2, the tape cassette 30 includes a cassette case 31. The cassette case 31 has a substantially rectangular parallelepiped shape. The cassette case 31 is configured by assembling the upper case 312 and a lower case 311 together.

An arm part 34 is provided on a front surface 301 of the cassette case 31. The arm part 34 extends leftward and frontward from a right-front portion of the cassette case 31. The opening 341 is formed in the left end of the arm part 34. The opening 341 has a slit-like shape elongated vertically. The heat-sensitive tape 4 pulled off a first supply roll 40 described later (see FIG. 3) is discharged from the cassette case 31 through the opening 341. In this way, a portion of the heat-sensitive tape 4 is exposed on the outside of the cassette case 31.

A head insertion section 39 is formed in the cassette case 31 on the rear side of the arm part 34. The head insertion section 39 penetrates the cassette case 31 vertically. The left-front portion of the head insertion section 39 opens forward. Hereinafter, this opening will be called a head opening 391. The head opening 391 is positioned downstream (leftward) of the opening 341 in the conveying direction of the heat-sensitive tape 4. The head holder 19 is inserted into the head insertion section 39 when the tape cassette 30 is mounted in the attachment portion 8.

The conveying roller 33 is provided to the left side of the head insertion section 39. The conveying roller 33 is positioned between the opening 341 and a guide part 38 (described later) in the conveying direction (left-right direction) of the heat-sensitive tape 4. The conveying roller 33 is cylindrical in shape and elongated vertically. The front end portion of the conveying roller 33 is exposed frontward from the cassette case 31. The conveying roller 33 supports the adhesive tape 7 in a state where the heat-sensitive tape 4 and adhesive tape 7 are in a superimposed state. The conveying roller 33 is rotatably supported in a support hole 35. The support hole 35 penetrates the cassette case 31 vertically. The drive shaft 18 is inserted inside the conveying roller 33 when the tape cassette 30 is mounted in the attachment portion 8. The conveying roller 33 is driven by the drive shaft 18 to rotate, so that the rotating conveying roller 33 conveys the heat-sensitive tape 4 and adhesive tape 7.

The guide part 38 is provided in the left-front corner portion of the cassette case 31. The guide part 38 is positioned downstream (left side) of the opening 341 in the conveying direction. Specifically, the guide part 38 is positioned downstream of the conveying roller 33 in the conveying direction. The guide part 38 has a slit-like shape that extends vertically. When conveyed by the conveying roller 33, the laminated tape 9 passes through the inside of the guide part 38. At this time, the guide part 38 support widthwise ends of the laminated tape 9 so that the laminated tape 9 can maintain its orientation while being discharged from the cassette case 31. In other words, the guide part 38 guides the laminated tape 9 to the outside of the cassette case 31.

As shown in FIG. 3, the first supply roll 40 and a second supply roll 70 are accommodated inside the cassette case 31. The first supply roll 40 is provided in the right-rear portion of the cassette case 31 and supplies the heat-sensitive tape 4. The first supply roll 40 is configured of a first tape spool 21 holding the heat-sensitive tape 4, and the heat-sensitive tape 4 that is wound clockwise in a plan view about the first tape spool 21 so as to gradually separate from the rotational center of the first tape spool 21. Specifically, the heat-sensitive tape 4 is wound about the first tape spool 21 such that a plurality of heat-sensitive layers 42 is on the inside of a base material 41 described later (see FIG. 4A). The first tape spool 21 is rotatably supported in a support hole 36. The support hole 36 penetrates the cassette case 31 vertically.

The second supply roll 70 is disposed in the left-rear portion of the cassette case 31 on the left side of the first supply roll 40 and supplies the adhesive tape 7. The second supply roll 70 is configured of a second tape spool 22 holding the adhesive tape 7, and the adhesive tape 7 that is wound over the second tape spool 22 in a counterclockwise direction in a plan view so as to gradually separate from the rotational center of the second tape spool 22. More specifically, the adhesive tape 7 is wound about the second tape spool 22 such that a first adhesive layer 73 described later (see FIG. 4B) is on the inside of a second adhesive layer 74 described later (a release paper 75, see FIG. 4B). The second tape spool 22 is rotatably supported in a support hole 37. The support hole 37 penetrates the cassette case 31 vertically.

Structure of the Heat-Sensitive Tape 4

In the following description, the top side and bottom side of each tape shown in FIGS. 4A to 4C will be referred to as the top and bottom of the tape.

Figure 4A:
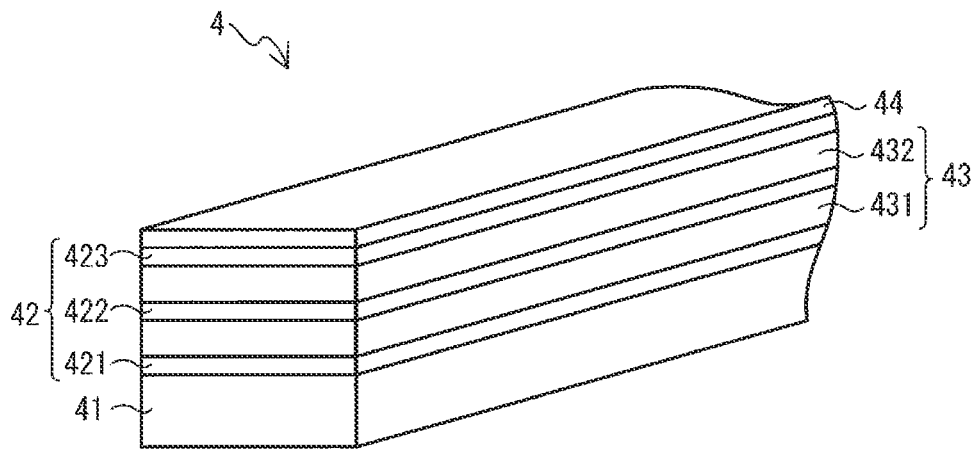
FIG. 4A is a perspective view of a heat-sensitive tape 4.

As shown in FIG. 4A, the heat-sensitive tape 4 is a long strip-like medium configured of a plurality of laminated layers. Specifically, the heat-sensitive tape 4 has the base material 41, a plurality of heat-sensitive layers 42, a plurality of heat-insulating layers 43, and an overcoat layer 44 (hereinafter collectively referred to as the "layers of the heat-sensitive tape 4"). In the present embodiment, the heat-sensitive layers 42 include a first heat-sensitive layer 421, a second heat-sensitive layer 422, and a third heat-sensitive layer 423. The heat-insulating layers 43 include a first heat-insulating layer 431, and a second heat-insulating layer 432.

The base material 41, first heat-sensitive layer 421, first heat-insulating layer 431, second heat-sensitive layer 422, second heat-insulating layer 432, third heat-sensitive layer 423, and overcoat layer 44 are laminated in a thickness direction of the heat-sensitive tape 4 (the vertical direction in FIG. 4A) in the order given, beginning from the bottom of the heat-sensitive tape 4. Thus, the overcoat layer 44 is provided on the opposite side of the heat-sensitive layers 42 from the base material 41. That is, the overcoat layer 44 constitutes the top surface of the heat-sensitive tape 4. The base material 41, first heat-sensitive layer 421, first heat-insulating layer 431, second heat-sensitive layer 422, second heat-insulating layer 432, and third heat-sensitive layer 423 have transparency.

The base material 41 is a resin film, and specifically a non-foamed resin film, and more specifically a non-foamed polyethylene terephthalate (PET) film. In other words, gas bubbles are not trapped inside the base material 41.

An image of a barcode Im (see FIG. 5C) is pre-printed on the top surface of the base material 41. In the present embodiment, a plurality of the barcodes Im is printed on the base material 41. The barcodes Im are printed at prescribed intervals. The light transmissivity of each of the images of the pre-printed barcodes Im is set lower than the light transmissivity of the color-developing parts of the heat-sensitive layers 42. The water vapor permeability of the base material 41 is lower than the water vapor permeability of the first heat-sensitive layer 421 in order to protect the heat-sensitive layers 42 bonded to the base material 41 from water vapor.

The heat-sensitive layers 42 are provided on the top surface of the base material 41. Each of the heat-sensitive layers 42 produces a corresponding color when heated to a color-developing temperature specific to that layer. The heat-sensitive layers 42 achieve this effect through the use of chemicals, such as those described in Japanese Patent Application Publication No. 2008-006830.

The first heat-sensitive layer 421 is formed as a film by coating the bottom surface of the first heat-insulating layer 431 with a chemical agent. The first heat-sensitive layer 421 is provided on the top surface of the base material 41. The first heat-sensitive layer 421 becomes less transparent and develops a first color when heated to a first temperature or higher. In the present embodiment, the first color is cyan.

The second heat-sensitive layer 422 is formed as a film by coating the bottom surface of the second heat-insulating layer 432 with a chemical agent. The second heat-sensitive layer 422 is provided on the opposite side of the first heat-sensitive layer 421 from the base material 41. The second heat-sensitive layer 422 becomes less transparent and develops a second color When heated to a second temperature or higher. The second temperature is higher than the first temperature. In the present embodiment, the second color is magenta.

The third heat-sensitive layer 423 is formed as a film by coating the top surface of the second heat-insulating layer 432 with a chemical agent. The third heat-sensitive layer 423 is provided on the opposite side of the second heat-sensitive layer 422 from the first heat-sensitive layer 421. The third heat-sensitive layer 423 becomes less transparent and develops a third color when heated to a third temperature or higher. The third temperature is higher than the second temperature. In the present embodiment, the third color is yellow.

The heat-insulating layers 43 are sheet-like layers. Owing to their low thermal conductivity, the heat-insulating layers 43 function as resistance to heat conduction. Accordingly, a temperature gradient along a direction of heat transfer is produced within each of the heat-insulating layers 43. As will be described later, when the thermal head 10 applies heat to the heat-sensitive tape 4 from the top side in FIGS. 4A-4C, the temperature on the bottom surface of each heat-insulating layer 43 is lower than the temperature, on the top surface of the heat-insulating layers 43. In this way, according to the thermal conductivity of each heat-insulating layer 43, the heat-insulating layer 43 can produce a desired difference in temperature between the two heat-sensitive layers 42 neighboring the heat-insulating layer 43 on the top and bottom sides thereof.

Specifically, the second heat-insulating layer 432 can produce a lower temperature in the second heat-sensitive layer 422 than the temperature in the third heat-sensitive layer 423. Similarly, the first heat-insulating layer 431 can produce a lower temperature in the first heat-sensitive layer 421 than the temperature in the second heat-sensitive layer 422. In this way, the heat-sensitive tape 4 can be configured to use the effect of the heat-insulating layers 43 to deliberately control the temperature of the first heat-sensitive layer 421 at a temperature higher than the first temperature and lower than the second temperature, the temperature of the second heat-sensitive layer 422 at a temperature higher than the second temperature and lower than the third temperature, and the temperature of the third heat-sensitive layer 423 at a temperature higher than the third temperature.

The overcoat layer 44 is formed as a film by coating the top surface of the third heat-sensitive layer 423. The overcoat layer 44 can transmit more blue visible light (light having a wavelength of about 470 nm, for example) than yellow visible light (light having a wavelength of about 580 nm, for example). Thus, the overcoat layer 44 has lower visible light transmittance for yellow than visible light transmittance for blue. The overcoat layer 44 protects the heat-sensitive layers 42 from the opposite side of the base material 41. That is, the overcoat layer 44 protects the heat-sensitive layers 42 from the top side of the heat-sensitive tape 4.

Overall, the heat-sensitive tape 4 has visible light transmittance in the thickness direction of the heat-sensitive tape 4. In other words, all layers of the heat-sensitive tape 4 have visible light transmittance. The visible light transmittance (%) of the base material 41 may be the same as the visible light transmittance of at least one selected from the group of: the heat-sensitive layers 42, heat-insulating layers 43, and overcoat layer 44. Alternatively, the visible light transmittance (%) of the base material 41 may differ from the visible light transmittance of the other layers of the heat-sensitive tape 4. For example, the visible light transmittance for each layer of the heat-sensitive tape 4 is equal to or higher than 90%, and may be at least 99%, and may be at least 99.9%. The visible light transmittance for each layer of the heat-sensitive tape 4 may be less than 90% as long as the visible light transmittance for each layer is at least sufficiently high for the user to visualize colors produced in the heat-sensitive layers 42 through the base material 41. Each layer of the heat-sensitive tape 4 is transparent or translucent.

The ultraviolet light transmittance (%) of the base material 41 is lower than the ultraviolet light transmittance of the first heat-insulating layer 431, and specifically lower than the ultraviolet light transmittance of all heat-insulating layers 43.

The thermal conductance of the base material 41 is lower than the thermal conductance of the first heat-insulating layer 431, and specifically lower than the thermal conductance of all heat-insulating layers 43. Thermal conductance (W/K) of a layer is the product of the thermal conductivity of the layer (W/(m·K)) and the thickness of the layer (m).

The thickness of the base material 41 is greater than the thickness of the first heat-insulating layer 431, and specifically greater than the thickness of all heat-insulating layers 43. The thickness of a layer corresponds to a vertical dimension of the layer in FIG. 4A. In FIG. 4A, the thickness for each layer of the heat-sensitive tape 4 and the relationship among magnitudes of thicknesses of the layers are depicted schematically to facilitate understanding, though the actual layer thicknesses and relationships among these thicknesses may differ from those given in FIG. 4A (this also applies to FIGS. 4B, 5A, 5B, 8A and 8B) For example, the thickness of the overcoat layer 44 may be greater than the thickness of each of the heat-sensitive layers 42, or may be the same or smaller than the thickness of each of the heat-sensitive layers 42.

Structure of the Adhesive Tape 7

Figure 4B:
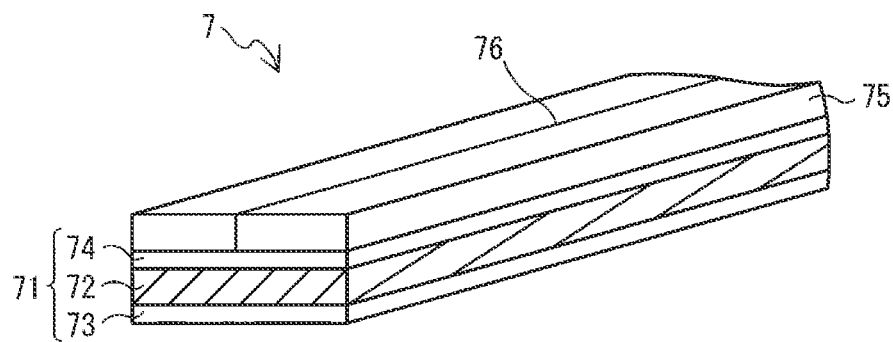
FIG. 4B is a perspective view of an adhesive tape 7.

As shown in FIG. 4B, the adhesive tape 7 is a long strip-like medium and is configured of a plurality of laminated layers. Specifically, the adhesive tape 7 includes a double-sided adhesive tape 71 and a release paper 75. The double-sided adhesive tape 71 is white in color. The double-sided adhesive tape 71 has a sheet 72, the first adhesive layer 73, and the second adhesive layer 74. The sheet 72 is white in color. In FIG. 4B, the sheet 72 (the double-sided adhesive tape 71) is filled with oblique lines to represent the color white (this also applies to FIGS. 4B, 5B, and 8B). In the present embodiment, the visible light transmittance of the sheet 72 is lower than the visible light transmittance of each layer in the heat-sensitive tape 4.

The first adhesive layer 73 is provided on the bottom surface of the sheet 72, and the second adhesive layer 74 is provided on the top surface of the sheet 72. That is, the double-sided adhesive tape 71 is configured by coating both top and bottom surfaces of the sheet 72 with adhesive.

The release paper 75 is bonded to the double-sided adhesive tape 71 through the second adhesive layer 74. A score line 76 is formed in the release paper 75. The score line 76 extends in a longitudinal direction of the adhesive tape 7 and divides the release paper 75 in two in a lateral direction thereof. The score line 76 also penetrates into a portion of the double-sided adhesive tape 71, but does not reach the first adhesive layer 73. In other words, the sheet 72 is formed continuously across the score line 76 and, thus, the double-sided adhesive tape 71 is formed continuously across the score line 76.

Structure of the Laminated Tape 9

Figure 4C:
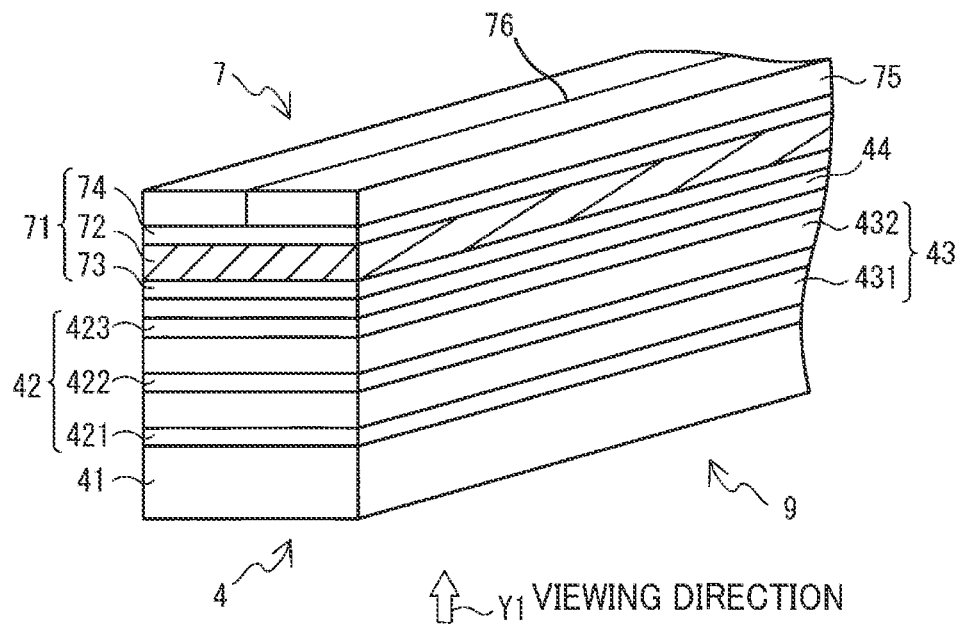
FIG. 4C is a perspective view of a laminated tape 9 configured of the heat-sensitive tape 4 and adhesive tape 7.

As shown in FIG. 4C, the laminated tape 9 is configured by bonding the bottom surface of the adhesive tape 7 to the top surface of the printed heat-sensitive tape 4. Accordingly, the laminated tape 9 includes the base material 41, first heat-sensitive layer 421, first heat-insulating layer 431, second heat-sensitive layer 422, second heat-insulating layer 432, third heat-sensitive layer 423, overcoat layer 44, first adhesive layer 73, sheet 72, second adhesive layer 74, and release paper 75 that are stacked in the thickness direction in the order given.

The user views the laminated tape 9 from the base material 41 side (i.e., the bottom side of the laminated tape 9), as indicated by the viewing direction Y1 in FIG. 4C. Since the heat-sensitive tape 4 has visible light transmittance as a whole, the user can see developed colors (i.e., printed images) in each of the heat-sensitive layers 42 through the base material 41 and the appearance of the adhesive tape 7 as the background when viewing the laminated tape 9 from the base material 41 side. Since the double-sided adhesive tape 71 is white in the preferred embodiment, the background of the laminated tape 9 appears white when the user views the laminated tape 9 from the base material 41 side. The user uses the laminated tape 9 by peeling the release paper 75 off the double-sided adhesive tape 71 and affixing the laminated tape 9 to a given wall, mount, or the like.

Note that the user cannot see developed colors (i.e., the printed images) in the heat-sensitive layers 42 from the adhesive tape 7 side (the top surface side of the laminated tape 9), even after peeling the release paper 75 off the double-sided adhesive tape 71, because the double-sided adhesive tape 71 is present on top of the heat-sensitive layers 42.

Conveying Paths for the Heat-Sensitive Tape 4 and Adhesive Tape 7

As shown in FIG. 3, the heat-sensitive tape 4 is drawn frontward off the right side of the first supply roll 40, and then turned leftward in the right-front corner portion of the cassette case 31. The heat-sensitive tape 4 passes through the inside of the arm part 34 and subsequently exits the cassette case 31 through the opening 341.

While in the head opening 391, the side of the heat-sensitive tape 4 having the heat-sensitive layers 42 (the top side of the heat-sensitive tape 4) opposes the thermal head 10 while the base material 41 side of the heat-sensitive tape 4 (the bottom side of the heat-sensitive tape 4) opposes the platen roller 15, as illustrated in FIG. 5A. Thus, in a state where the tape cassette 30 is mounted in the attachment portion 8, the thermal head 10 is positioned on the opposite side of the heat-sensitive layers 42 from the base material 41 (i.e., positioned rearward of the heat-sensitive tape 4). Accordingly, the thermal head 10 can heat the heat-sensitive tape 4 in the head opening 391 on the opposite side of the heat-sensitive tape 4 from the base material 41 (see the printing direction Y2).

As shown in FIG. 3, the heat-sensitive tape 4 passes through the head opening 391 and between the conveying roller 33 and movable roller 14. At this time, the heat-sensitive layers 42 side of the heat-sensitive tape 4 opposes the conveying roller 33, while the base material 41 side of the heat-sensitive tape 4 opposes the movable roller 14, as illustrated in FIG. 5B.

As shown in FIG. 3, the adhesive tape 7 is pulled frontward from the left side of the second supply roll 70. The adhesive tape 7 then curves leftward while in contact with the right-front circumferential portion of the conveying roller 33. At this time, the release paper 75 side of the adhesive tape 7 (the top side of the adhesive tape 7) opposes the conveying roller 33 while the double-sided adhesive tape 71 side (the bottom side of the adhesive tape 7) opposes the movable roller 14, as illustrated in FIG. 5B. Accordingly, with the adhesive tape 7 overlapping the heat-sensitive tape 4 on the opposite side of the heat-sensitive layers 42 from the base material 41, the conveying roller 33 supports the adhesive tape 7 from the opposite side of the heat-sensitive tape 4.

With the heat-sensitive tape 4 and adhesive tape 7 superimposed, the heat-sensitive tape 4 and adhesive tape 7 are bonded together between the movable roller 14 and conveying roller 33, thereby forming the laminated tape 9. As shown in FIG. 3, the laminated tape 9 is discharged from the tape cassette 30 after passing through the interior of the guide part 38. The laminated tape 9 is conveyed to the cutting mechanism 16, and the cutting mechanism 16 cuts the laminated tape 9. Once cut, the laminated tape 9 is discharged from the thermal printer 1 through the discharge slit formed in the device body 2.

Electrical Structure of the Thermal Printer 1

Figure 6:
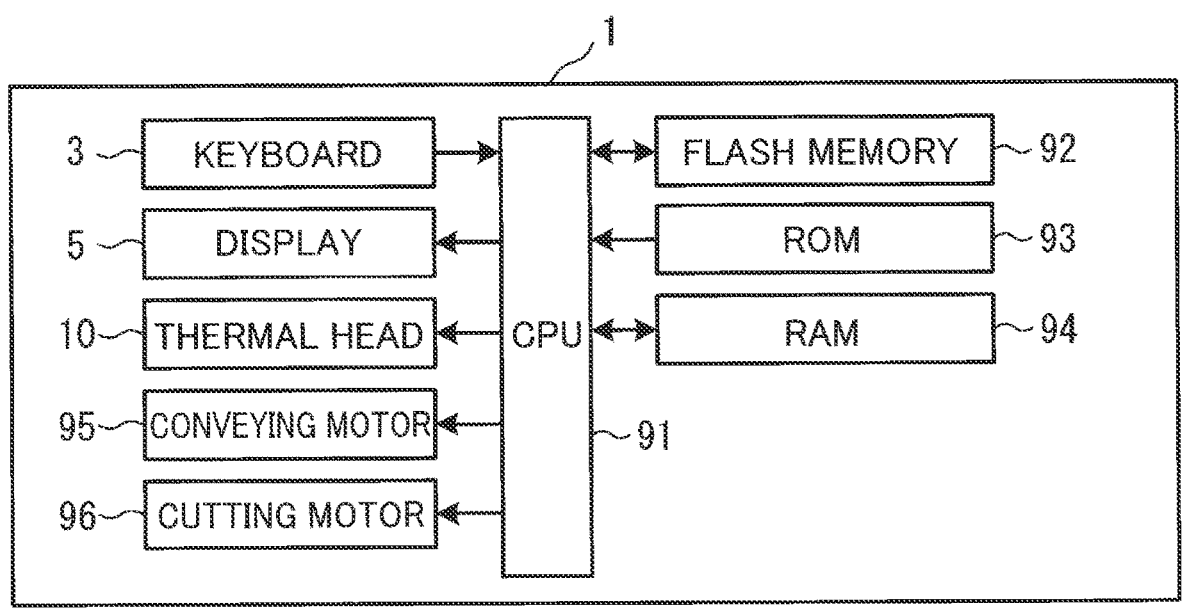
FIG. 6 is a block diagram illustrating the electrical configuration of the thermal printer 1.

As shown in FIG. 6, the thermal printer 1 includes a CPU 91. The CPU 91 functions as a processor for controlling the thermal printer 1. The CPU 91 is electrically connected to a flash memory 92, a ROM 93, and a RAM 94, as well as the keyboard 3, display 5, thermal head 10, conveying motor 95, and cutting motor 96 described earlier.

The flash memory 92 stores programs executed by the CPU 91, and the like. The ROM 93 stores various parameters required for executing the various programs. The RAM 94 stores various temporary data, such as print data used for forming images.

Process for Creating Laminated Tape in the Thermal Printer 1

The user inputs a print start command into the thermal printer 1 by operating the keyboard 3. Upon acquiring the print start command, the CPU 91 reads a program from the flash memory 92 and executes a laminated tape creation process illustrated in FIG. 7. In the laminated tape creation process, the CPU 91 controls the thermal printer 1 to perform printing operations in order to create the laminated tape 9.

Figure 7:
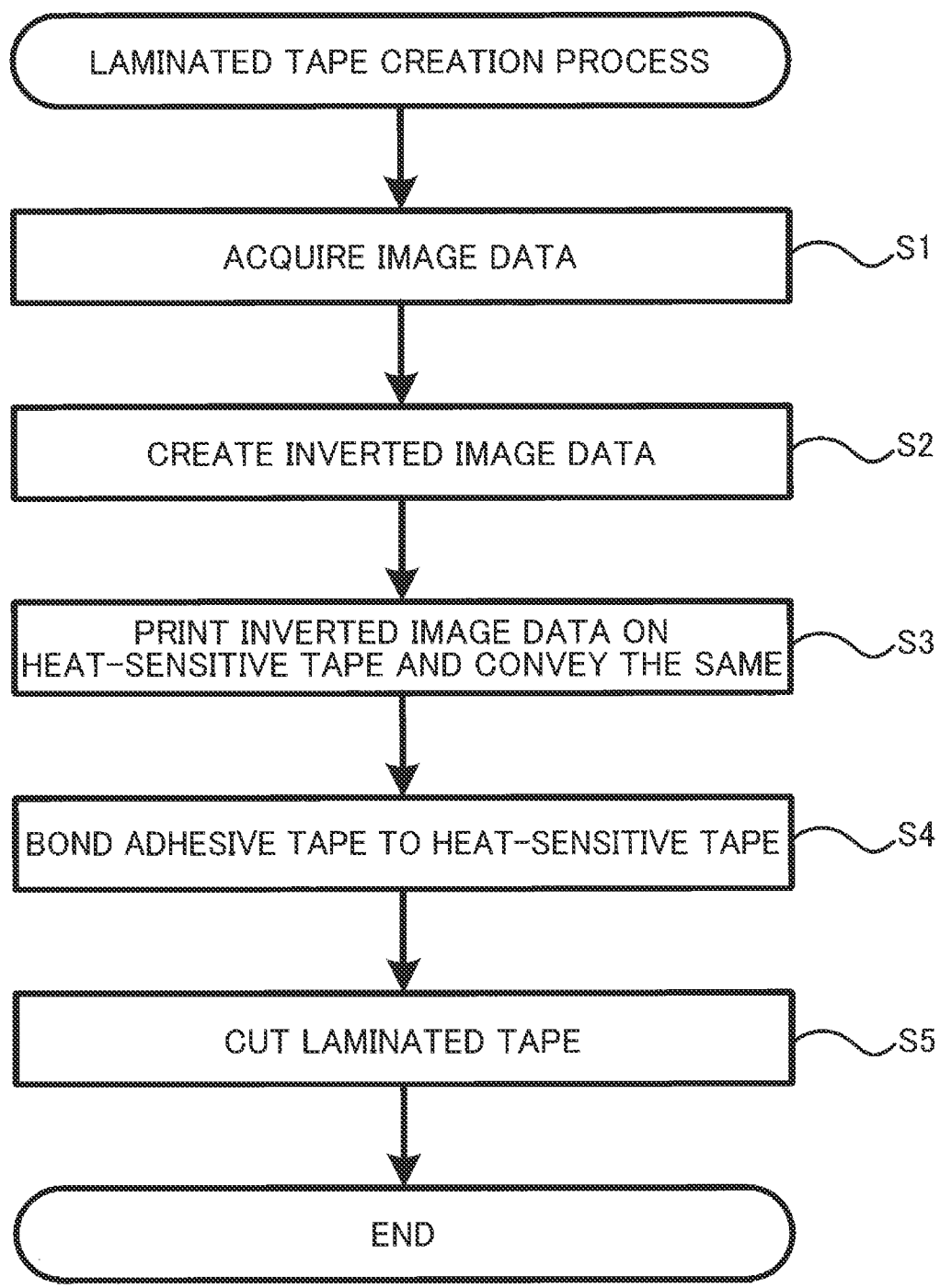
FIG. 7 is a flowchart illustrating a laminated tape creation process.

Referring to FIG. 7, in S1, the CPU 91 acquires image data representing an image specified by the user. The user specifies the image to be formed on the laminated tape 9 in advance on the keyboard 3. The image to be formed on the laminated tape 9 is the image that can be seen by a user looking at the laminated tape 9 in the viewing direction Y1.

Below, a case in which the user has specified an image of "q" will be described as an example.

In S2, the CPU 91 creates image data representing an inverted image by inverting the acquired image data. Inversion is a process of flipping the content of an image about a line 85. The line 85 is parallel to the longitudinal direction of the heat-sensitive tape 4 and passes through the lateral center of the heat-sensitive tape 4 when the image is viewed in the printing direction Y2. More specifically, when the image of "q" has been specified, the CPU 91 inverts the image of "q" to create image data representing "d" (hereinafter called an inverted image 81), as illustrated in FIG. 8A.

In S3, the CPU 91 performs print control based on the image data created in S2 for the inverted image. The CPU 91 controls the conveying motor 95 to rotate the drive shaft 18. As the drive shaft 18 is driven to rotate, the heat-sensitive tape 4 is pulled off the first supply roll 40 and the adhesive tape 7 is pulled off the second supply roll 70 through the cooperative operations of the conveying roller 33 and movable roller 14.

While continuing to control the conveying motor 95, the CPU 91 farther controls the thermal head 10. Specifically, while conveying the heat-sensitive tape 4, the CPU 91 selectively heats the heating elements 11 such that the inverted image created in S2 is formed in the heat-sensitive layers 42. At this time, the thermal head 10 heats the heat-sensitive tape 4 on the opposite side of the heat-sensitive layers 42 from the base material 41, as described above. Through this operation, the inverted image is printed on the heat-sensitive tape 4.

Figure 8A:
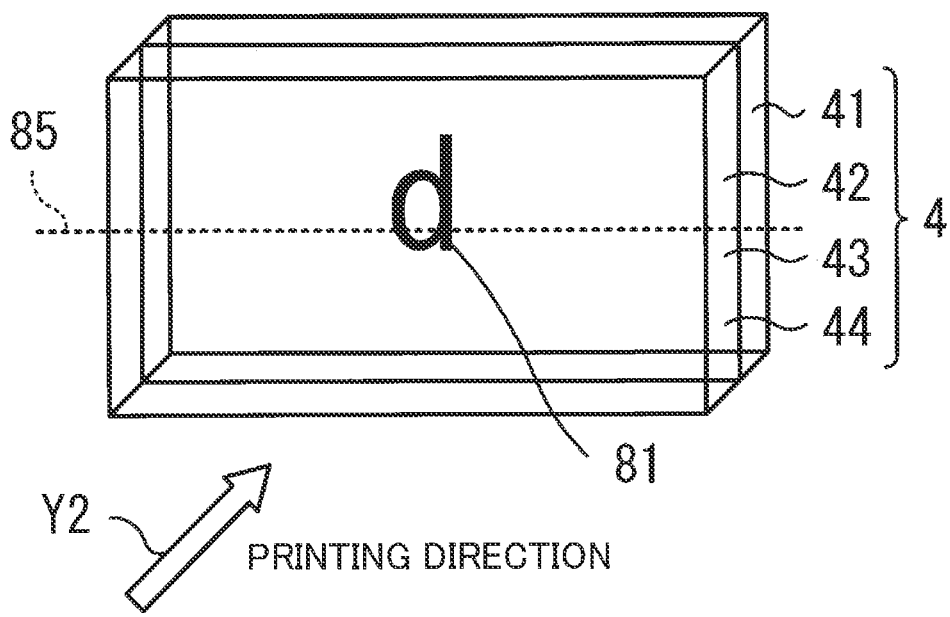
FIG. 8A is a perspective view illustrating how an inverted image is seen on the printed heat-sensitive tape 4.

As shown in FIG. 8A, the inverted image 81 is formed in the heat-sensitive layers 42 when the user has specified the image "q". When viewed in the printing direction Y2, the inverted image 81 represents "d".

In S4, the CPU 91 performs control to bond the adhesive tape 7 to the printed heat-sensitive tape 4. Specifically, by controlling the conveying motor 95 to rotate the drive shaft 18, the CPU 91 conveys the printed heat-sensitive tape 4 and adhesive tape 7 between the conveying roller 33 and movable roller 14, so that the adhesive tape 7 is bonded to the printed heat-sensitive tape 4 on the opposite side of the heat-sensitive layers 42 from the base material 41. Through these operations, the laminated tape 9 is created. In S5, the CPU 91 controls the cutting motor 96 to drive the cutting mechanism 16 to cut the laminated tape 9. This completes the laminated tape creation process.

Figure 8B:
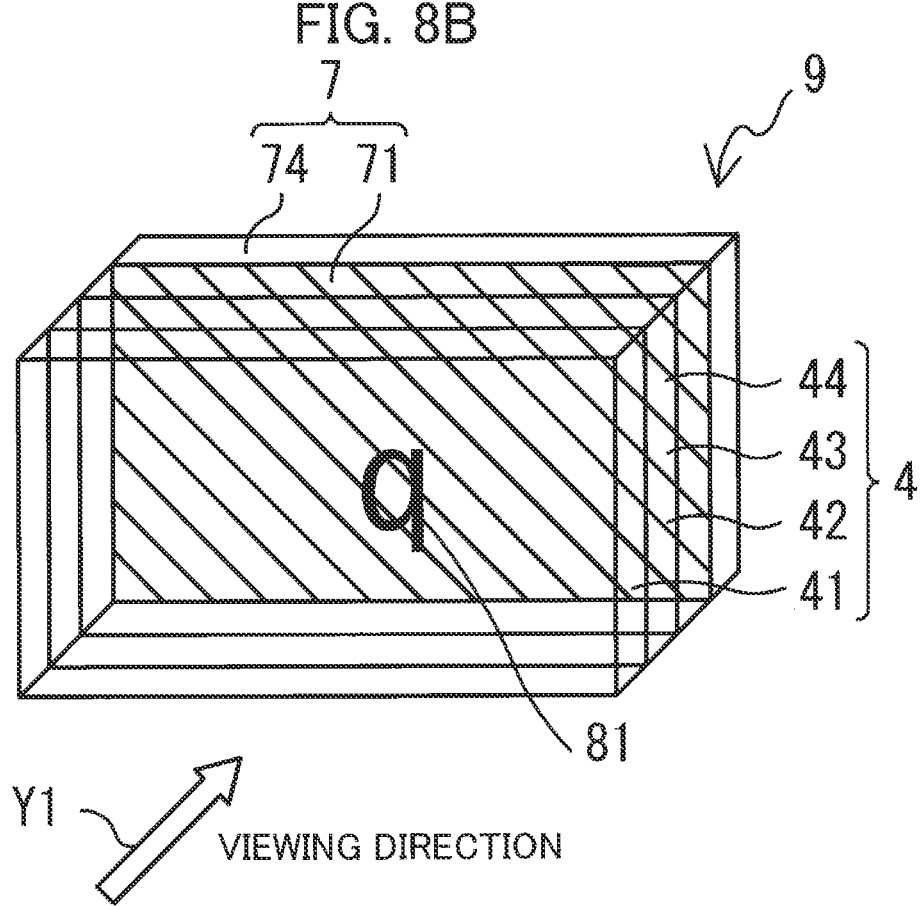
FIG. 8B is a perspective view illustrating how the inverted image is seen on the created laminated tape 9.

As shown in FIG. 8B, the viewing direction Y1 is the opposite direction of the printing direction Y2 relative to the heat-sensitive tape 4. Accordingly, when the user views the laminated tape 9 from the base material 41 side (i.e., in the viewing direction Y1), the inverted image 81 represents the image "q". Hence, the laminated tape 9 that has the image "q" specified by the user is obtained.

Principal Effects of the Embodiment

As described above, the adhesive tape 7 is bonded to the heat-sensitive tape 4 on the opposite side of the first heat-sensitive layer 421 from the base material 41. The barcodes Im are pre-printed on the base material 41.

Since the barcodes Im are printed on the base material 41 of the laminated tape 9, the barcodes Im are highly visible to the user. Accordingly, the laminated tape 9 of the present embodiment can enhance visibility of the pre-printed barcodes Im. Moreover, the laminated tape 9 improves reading precision for reading the barcodes Im with an optical sensor, for example.

The barcodes Im are printed on the top surface of the base material 41. Hence, the laminated tape 9 improves abrasion resistance of the barcodes Im while ensuring visibility.

The barcodes Im are printed so as to have lower light transmissivity than the light transmissivity of the color-developing part of the first heat-sensitive layer 421. The color-developing part of the first heat-sensitive layer 421 is gold or black in color, for example. Gold is a color that cannot be rendered by the first heat-sensitive layer 421. When black is produced in the heat-sensitive layer, the edges tend to be blurred. Thus, by printing the barcodes Im with a lower light transmissivity, the laminated tape 9 can improve the quality of the printed image.

The base material 41 has a lower water vapor permeability than the water vapor permeability of the first heat-sensitive layer 421. Thus, water vapor cannot easily penetrate to the first heat-sensitive layer 421. Accordingly, the laminated tape 9 can prevent discoloration or other deterioration in quality in the base material 41 caused by moisture.

A plurality of the barcodes Im is provided on the base material 41. The barcodes Im are printed at prescribed intervals. Hence, the laminated tape 9 improves the visibility of the plurality of images printed at prescribed intervals.

The second heat-sensitive layer 422 becomes less transparent and develops the second color different from the first color when heated to the second temperature different from the first temperature. The third heat-sensitive layer 423 becomes less transparent and develops the third color different from both of the first color and second color when heated to the third temperature different from both of the first temperature and second temperature. Owing to the heat-sensitive layers 421 through 423, the laminated tape 9 can execute printing in a plurality of colors. Thus, the laminated tape 9 can improve the quality of the printed image.

The second temperature is higher than the first temperature, and the third temperature is higher than the second temperature. Thus, the heat-sensitive layers 42 can produce each of the first through third colors at different temperatures. Since the distance from the thermal head 10 to the third heat-sensitive layer 423 is small in this configuration, the temperature of heat applied to the third heat-sensitive layer 423 need not be as high as when the order of the color-developing temperatures is reversed. Consequently, heating produces little roughness in the overcoat layer 44, and thus diffuse reflection of light caused by such roughness is providing good visibility of the laminated tape 9.

The tape cassette 30 is provided with the cassette case 31, the first tape spool 21, and the second tape spool 22. The first tape spool 21 is provided inside the cassette case 31 for holding the heat-sensitive tape 4. The second tape spool 22 is provided inside the cassette case 31 for holding the adhesive tape 7. Thus, the tape cassette 30 can accommodate the adhesive tape 7 and the heat-sensitive tape 4 includes the base material 41 having the barcodes Im pre-printed thereon.

The CPU 91 prints by heating the first heat-sensitive layer 421 provided on the base material 41 having the pre-printed image. After the first heat-sensitive layer 421 has been printed, the CPU 91 creates the laminated tape 9 by bonding the adhesive tape 7 to the printed heat-sensitive tape 4 on the opposite side of the first heat-sensitive layer 421 from the base material 41. Hence, the printing system of the present embodiment can create a laminated tape 9 having a barcode Im pre-printed on the base material 41.

Variations

While the embodiment has been described above in detail, many modifications and variations may be made to the embodiment.

For example, the base material 41 in the embodiment may be a foamed PET film. For example, the PET film may be configured of polyethylene terephthalate. Alternatively, the base material 41 may be a resin film formed of polyethylene (PE), low-density polyethylene (LDPE), high-density polyethylene (HDPE), polypropylene (PP), oriented polypropylene (OPP), vapor deposition film of SiOx, ethylene vinyl acetate (EVA) copolymer, ethylene methacrylic acid (EMAA) copolymer, polybutene (PB), polybutadiene (BDR), polymethylpentene (PMP), polyethylene naphthalate (PEN), polybutylene terephthalate (PBT), polyimide (PI), polyetherimide (PEI), polyetherketone (PEK), polyether ether ketone (PEEK), nylon (NY), polyamide (PA), polycarbonate (PC), polystyrene (PS), foamed/expanded polystyrene (FS/EPS), polyvinyl chloride (PVC), polyvinylidene chloride (PVDC), saponified ethylene vinyl alcohol (EVOH), polyvinyl alcohol (PVA), plain transparent (PT) cellophane, moisture-proof sealable transparent (MST) cellophane, polyacrylonitrile (PAN), vinylon (VL), polyurethane (PU), triacetyl cellulose (TAC), or the like. In these cases, the base material 41 may be a foamed or a non-foamed resin film.

Since foamed resin has lower thermal conductivity than the same resin that is not foamed, the thermal conductivity of the base material 41 can be lowered through a simple construction when the base material 41 is configured of a foamed resin film. When the base material 41 has low thermal conductivity, heat inputted into the heat-sensitive tape 4 from the heat-sensitive layer 42 side is less likely to be diffused in the base material 41 when printing with the thermal printer 1. Accordingly, using a foamed resin film as the base material 41 can reduce the quantity of heat needed to be inputted into the heat-sensitive tape 4 for developing color in the heat-sensitive layers 42 through a simple configuration. In other words, by using foamed resin film for the base material 41, the quantity of heat inputted into the heat-sensitive tape 4 for producing color in the heat-sensitive layers 42 can be reduced without needing to use a special material in the base material 41 for reducing thermal conductivity.

When the adhesive tape 7 is bonded to the heat-sensitive tape 4 after the thermal printer 1 has printed on the heat-sensitive tape 4, the base material 41 functions as a laminate member for protecting the heat-sensitive layers 42. If the base material 41 has low thermal conductivity, the base material 41 can better prevent unintended discoloration in the heat-sensitive layers 42 caused by heat inputted into the base material 41 side than when the base material 41 is formed of material having high thermal conductivity.

When the base material 41 is configured of non-foamed resin film, the visible light transmittance of the base material 41 tends to be higher than when the base material 41 is formed of foamed resin film. Accordingly, the printed image in the laminated tape 9 will appear clear and distinct to the user.

Provided that the base material 41 has sufficient visible light transmittance for its application, the base material 41 may be formed of a metal foil (aluminum foil or copper foil), a vacuum metalized (VM) film, or the like, or may be configured of one of various types of paper, such as translucent paper, washi (traditional Japanese paper), wood-free paper, dust-free paper, glassine, clay-coated paper, resin-coated paper, laminated paper (polyethylene-laminated paper, polypropylene-laminated paper, etc.), synthetic paper, kraft paper, and the like. The first protective layer 591 may also be formed of a nonwoven cloth or a glass cloth, for example.

While the pre-printed image is the barcode Im in the present embodiment described above, the pre-printed image may be other images including characters, graphics, symbols, or the like. Examples of these images are two-dimensional codes, such as a QR code ("QR code" is a Japanese registered trademark of DENSO WAVE INCORPORATED), a Data Matrix, a MaxiCode, a PDF417, an Aztec Code, and a POSTNET. Further, while the image (i.e., barcode) is pre-printed on the top surface of the base material 41 in the present embodiment described above, the image may instead be pre-printed on the opposite surface, i.e., the bottom surface of the base material 41. An image printed on the bottom surface of the base material 41 can be directly viewed by the user.

In the embodiment, the overcoat layer 44 may transmit more yellow visible light than blue visible light, and may be translucent or opaque. Alternatively, the overcoat layer 44 may be made of a material identical to that of the heat-insulating layers 43. In other words, another heat-insulating layer (third heat-insulating layer) may be provided as the overcoat layer 44. Still alternatively, the overcoat layer 44 may be omitted. In this case, thermal conductivity from the thermal head 10 to the heat-sensitive layers 42 is enhanced. Accordingly, the thermal printer 1 can shorten a heating period by the thermal head 10, and can reduce the cost required for the overcoat layer 44.

In the embodiment, the double-sided adhesive tape 71 may be transparent. Alternatively, the double-sided adhesive tape 71 (the sheet 72) may be a color other than white or may be colored with one or a plurality of colors. Thus, a pattern or the like may be applied to the double-sided adhesive tape 71 (the sheet 72). By changing the color of the sheet 72, the tape cassette 30 can provide a variety of background colors and patterns that the user sees when viewing the laminated tape 9 from the heat-sensitive tape 4 side. Particularly, in a case where a configuration is employed that the double-sided adhesive tape 71 produces a dark color, the thickness of the adhesive tape 7 can more easily be reduced when coloring the sheet 72 than when coloring the first adhesive layer 73.

The double-sided adhesive tape 71 may be opaque, or may be translucent or transparent. The visible light transmittance of the sheet 72 may be lower than the visible light transmittance of one of the layers in the heat-sensitive tape 4, may be higher than the visible light transmittance of all layers in the heat-sensitive tape 4, or may be higher than the visible light transmittance for one of the layers in the heat-sensitive tape 4. When the double-sided adhesive tape 71 is transparent or translucent (i.e., when the double-sided adhesive tape 71 has visible light transmittance), if the laminated tape 9 is affixed to a prescribed wall, for example, the wall becomes the background. Accordingly, the user can freely modify the background according to the wall to which the laminated tape 9 is affixed. At least one of the first adhesive layer 73 and second adhesive layer 74 may be colored or made opaque. In other words, both of the first adhesive layer 73 and second adhesive layer 74 may be colored or made opaque, or only one of the first adhesive layer 73 and second adhesive layer 74 may be colored or made opaque.

In the embodiment, the second adhesive layer 74 may be omitted from the adhesive tape 7. In this case, after completion of creation of the laminated tape 9, the user may apply adhesive to the surface of the sheet 72 on the side opposite the first adhesive layer 73 may apply adhesive to the surface of the sheet 72 that is exposed to the outside), for example. The adhesive tape 7 in the embodiment may be self-adhesive. The second supply roll 70 in the tape cassette 30 can be made more compact when the adhesive tape 7 is thin. Accordingly, the cassette case 31 of the tape cassette 30 can be made more compact.

The heat-sensitive layers 42 in the present embodiment may be configured of just two layers. In other words, the third heat-sensitive layer 423 may be omitted and, hence, the second heat-insulating layer 432 may also be omitted. In this case, the first heat-sensitive layer 421 may be formed by applying a chemical agent to the bottom surface of the first heat-insulating layer 431 while the second heat-sensitive layer 422 is formed by applying a chemical agent to the top surface of the first heat-insulating layer 431. Thus, it is sufficient for the heat-sensitive tape 4 to include at least one heat-insulating layer.

Alternatively, the heat-sensitive layers 42 in the present embodiment may be configured of four or more layers. For example, a fourth heat-sensitive layer (not shown) may be provided on the opposite side of the third heat-sensitive layer 423 from the second heat-sensitive layer 422. In this case, the fourth heat-sensitive layer develops a fourth color when heated to a fourth temperature or higher. The fourth temperature is higher than the third temperature. The fourth color may be black, for example. In this configuration, a third heat-insulating layer (not shown) is provided between the third heat-sensitive layer 423 and the fourth heat-sensitive layer in the thickness direction.

The first color, second color, and third color in the depicted embodiment may be colors other than cyan, magenta, and yellow, respectively. For example, the first, second, and third colors may all be the same color. When multiple layers of the same color are superimposed in the laminated tape 9, the laminated tape 9 can depict depth in the formed image.

Each of the heat-sensitive layers 42 produces color at a different temperature. In the present embodiment, the second temperature is higher than the first temperature and the third temperature is higher than the second temperature. However, the second temperature may be higher than the third temperature, and the first temperature may be higher than the second temperature. Since the distance from the thermal head 10 to the first heat-sensitive layer 421 is greater, the heat applied to the first heat-sensitive layer 421 in this case must be at a higher temperature than in the case of the present embodiment. Consequently, such heat produces greater roughness in the overcoat layer 44, leading to a stronger bond between the overcoat layer 44 and the first adhesive layer 73.

The heat-sensitive layers 42 may be formed by applying chemical agent to the top surfaces of the heat-insulating layers 43. Alternatively, the heat-sensitive layers 42 may be preformed in a sheet-like shape and bonded by adhesive to the respective heat-insulating layers 43.

In the embodiment, the ultraviolet light transmittance of the base material 41 may be higher than the ultraviolet light transmittance of the first heat-insulating layer 431 or may be higher than the ultraviolet light transmittance of all heat-insulating layers 43. The thermal conductivity of the base material 41 may be higher than the thermal conductivity of the first heat-insulating layer 431 or may be higher than the thermal conductivity of all heat-insulating layers 43. The thickness of the base material 41 may be less than the thickness of the first heat-insulating layer 431 or may be less than the thickness of all heat-insulating layers 43.

The refractive index of the base material 41 may be lower than the refractive index of the first heat-insulating layer 431, may be lower than the refractive index of one of the heat-insulating layers 43, or may be lower than the refractive index of all heat-insulating layers 43. When the refractive index of the base material 41 is low, light incident on the base material 41 side of the heat-sensitive tape 4 is less likely to be completely reflected by the interface between the base material 41 and any of the heat-insulating layers 43. Accordingly, the tape cassette 30 can provide the user with the laminated tape 9 having low gloss, known as a matte finish.

The score line 76 described in the embodiment need not be formed in a straight line, but may be formed in a wavy line or the like. Further, a plurality of score lines 76 juxtaposed in the widthwise direction may be formed in the release paper 75 rather than just a single score line 76. Alternatively, a plurality of score lines 76 extending laterally (in the widthwise direction) may be formed at prescribed intervals in the longitudinal direction of the release paper 75. The score lines 76 may also extend obliquely to the widthwise and longitudinal directions.

The cassette case 31 in the embodiment described above may accommodate a first fanfold stack in place of the first supply roll 40. That is, the first fanfold stack may be accommodated in the cassette case 31 for supplying the heat-sensitive tape 4 that has been accordion-folded into a stack. A second fanfold stack may be accommodated in the cassette case 31 in place of the second supply roll 70. In other words, the second fanfold stack may be accommodated in the cassette case 31 for supplying the adhesive tape 7 that has been accordion-folded into a stack.

The first supply roll 40 of the depicted embodiment may be a coreless roll that omits the first tape spool 21. Similarly, the second supply roll 70 may be a coreless roll that omits the second tape spool 22.

The conveying roller 33 described in the embodiment rimy be provided as part of the thermal printer 1 rather than the tape cassette 30. In other words, the conveying roller 33 may be pre-mounted on the drive shaft 18, and the printed heat-sensitive tape 4 and adhesive tape 7 may be bonded together by members provided on the thermal printer 1 (the conveying roller 33 pre-mounted on the drive shaft 18, and the movable roller 14).

The CPU 91 need not perform the process of S2 described in the embodiment. In other words, the CPU 91 need not create inverted image data. In this case, the user may invert the image to be formed on the laminated tape 9 and may input this inverted image data into the thermal printer 1. Thus, if the image to be formed on the laminated tape 9 is "q", the user may specify "d". The processes in S1 and S2 may also be executed on an external device connected to the thermal printer 1, such as a personal computer or a smartphone.

In the embodiment described above, the user may cut the laminated tape 9 manually. The cutting mechanism 16 may execute a half-cut by cutting through the entire heat-sensitive tape 4 of the laminated tape 9 in the thickness direction while the adhesive tape 7 remains continuously intact in the longitudinal direction at the cutting position.

The user may also manually bond the printed heat-sensitive tape 4 to the adhesive tape 7. In this case, the thermal printer 1 need not be provided with a mechanism for bonding the heat-sensitive tape 4 to the adhesive tape 7.

Further, a portion of the top surface, bottom surface, and side surfaces of the cassette case 31 may be eliminated. The conveying roller 33 may also be a non-rotatable body, such as a fixed cylindrical body or plate-shaped body. In this case, the drive force of the conveying motor 95 may be transmitted to the movable roller 14, for example.

In the depicted embodiment, the heat-sensitive tape 4 has a plurality of heat-sensitive layers 42, but the heat-sensitive tape 4 may instead have just a single heat-sensitive layer. In this case, the base material 41, first heat-sensitive layer 421, first heat-insulating layer 431, and overcoat layer 44 are laminated in the order given, for example, After printing has been performed on the heat-sensitive tape 4, the adhesive tape 7 having the score line 76 is bonded to the opposite side of the heat-sensitive tape 4 from the base material 41. Accordingly, this tape cassette can suppress deterioration in print quality due to the score line 76. That is, since the adhesive tape 7 is bonded to the heat-sensitive tape 4 after printing on the heat-sensitive tape 4 is con the tape cassette 30 can suppress occurrence of the white line effect not only when the heat-sensitive tape 4 possesses a plurality of heat-sensitive layers 42, but also when the heat-sensitive tape 4 possesses just a single heat-sensitive layer.

Note that when the heat-sensitive tape 4 possesses just a single heat-sensitive layer, both the first heat-insulating layer 431 and the overcoat layer 44 may be omitted. In this case, the single heat-sensitive layer may be formed by applying a chemical agent to the top surface of the base material 41.

The CPU 91 may create image data representing an inverted image in the process of S2 by flipping the content of the image about a line extending parallel to the lateral direction of the heat-sensitive tape 4 and passing through the longitudinal center of the heat-sensitive tape 4 when viewing the image in the printing direction Y2. More specifically, if an image of "q" has been specified, the CPU 91 may invert the image of "q" to create image data representing "p" instead of the image "d" described in the embodiment.

In place of the CPU 91, the thermal printer 1 may employ a microcomputer, application-specific integrated circuits (ASICs), field-programmable gate arrays (FPGAs), or the like as the processor. The process for creating a laminated tape may be a distributed process performed by a plurality of processors. The non-transitory storage medium may be any storage medium capable of holding information, regardless of the duration that the information is stored. The non-transitory storage medium need not include transitory storage media (conveyed signals, for example). The program may be downloaded from a server connected to a network (i.e., transmitted as a transmission signal) and stored in the flash memory 92, for example. In this case, the program may be saved in a non-transitory storage medium, such as a hard disk drive provided in the server.

The variations described above may be combined in any way that does not produce inconsistencies.

Remarks

The laminated tape 9 is an example of the "medium". The heat-sensitive tape 4 is an example of the "heat-sensitive medium". The base material 41 is an example of the "first base material". The top surface of the base material 41 is an example of the "first surface of the first base material". The bottom surface of the base material 41 is an example of the "second surface". The sheet 72 is an example of the "second base material". The first heat-sensitive tape 421 is an example of the "first color-developing layer". The second heat-sensitive tape 422 is an example of the "second color-developing layer". The third heat-sensitive tape 423 is an example of the "third color-developing layer". The adhesive tape 7 is an example of the "adhesive medium". The first adhesive layer 73 is an example of the "adhesive layer". The tape cassette 30 is an example of the "cartridge". The cassette case 31 is an example of the "case". The first tape spool 21 is an example of the "first holder". The second tape spool 22 is an example of the "second holder". The process in S3 of FIG. 7 is an example of the "printing in (a)". The process in S4 of FIG. 7 is an example of the "creating in (b)". The barcode images Im are an example of the "one or more images".

What is claimed is:

1. A medium comprising:
    a heat-sensitive medium to be subjected to printing in a thermal printer, the heat-sensitive medium comprising:
        a first base material having a transparency, the first base material having a first surface; and
        a first color-developing layer having a transparency, the first color-developing layer being provided on the first surface of the first base material, the first color-developing layer being configured to become less transparent to develop a first color when heated to a first temperature or higher; and
    an adhesive medium to be superimposed on and bonded to the heat-sensitive medium in a thickness direction of the adhesive medium and the heat-sensitive medium, the adhesive medium comprising:
        a second base material; and
        an adhesive layer provided on the second base material,
    wherein the adhesive medium is to be bonded to the heat-sensitive medium on an opposite side of the first color-developing layer from the first base material,
    wherein the first base material has one or more images pre-printed on the first base material, and
    wherein the second base material is white or is colored with at least one color.

2. The medium according to claim 1,
    wherein the first base material has a second surface opposite the first surface, and
    wherein the one or more images are printed on the second surface of the first base material.

3. The medium according to claim 1,
    wherein the one or more images are printed on the first surface of the first base material.

4. The medium according to claim 1,
    wherein the one or more images are printed so as to have a light transmissivity lower than a light transmissivity of a color-developing part of the first color-developing layer.

5. The medium according to claim 1,
    wherein the first base material has a water vapor permeability lower than a water vapor permeability of the first color-developing layer.

6. The medium according to claim 1,
    wherein the one or more images are barcodes.

7. The medium according to claim 1,
    wherein the one or more images are a plurality of images printed at prescribed intervals.

8. The medium according to claim 1,
    wherein the heat-sensitive medium further comprises:
        a second color-developing layer provided on an opposite side of the first color-developing layer from the first base material, the second color-developing layer being configured to become less transparent to develop a second color when heated to a second temperature or higher, the second color being different from the first color, the second temperature being different from the first temperature; and a third color-developing layer provided on an opposite side of the second color-developing layer from the first color-developing layer, the third color-developing layer being configured to become less transparent to develop a third color when heated to a third temperature or higher, the third color being different from both of the first color and the second color, the third temperature being different from both of the first temperature and the second temperature.

9. The medium according to claim 8,
wherein the second temperature is higher than the first temperature, and the third temperature is higher than the second temperature.

10. The medium according to claim 8,
wherein the first temperature is higher than the second temperature, and the second temperature is higher than the third temperature.

11. A cartridge for accommodating therein the medium according to claim 1, comprising:
   a case;
   a first holder provided inside the case, the first holder holding the heat-sensitive medium; and
   a second holder provided inside the case, the second holder holding the adhesive medium.

12. A method of creating a laminated medium using the medium according to claim 1, comprising:
   (a) printing by heating the first color-developing layer; and
   (b) after performing the printing in (a), creating a laminated medium by bonding the adhesive medium to the heat-sensitive medium on an opposite side of the first color-developing layer from the first base material.

* * * * *